Figure 6:
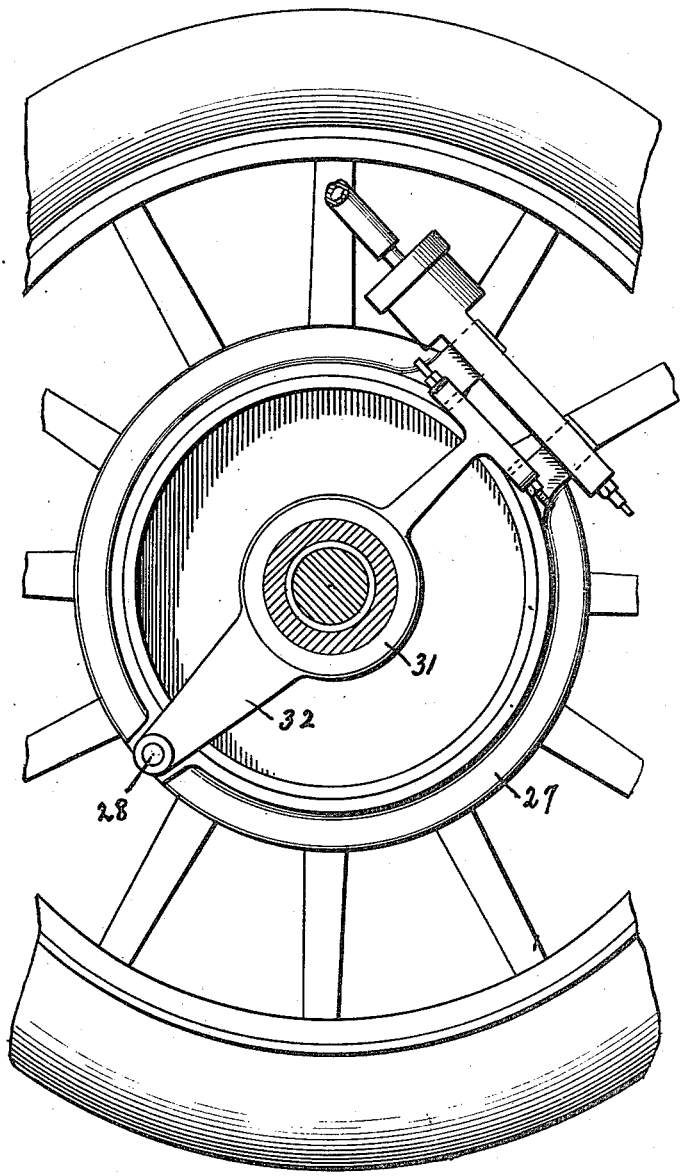

A. G. McGREGOR.
FLUID PRESSURE CONTROLLING SYSTEM FOR MOTOR VEHICLES.
APPLICATION FILED JUNE 14, 1910.
1,044,898.
Patented Nov. 19, 1912
4 SHEETS—SHEET 1.
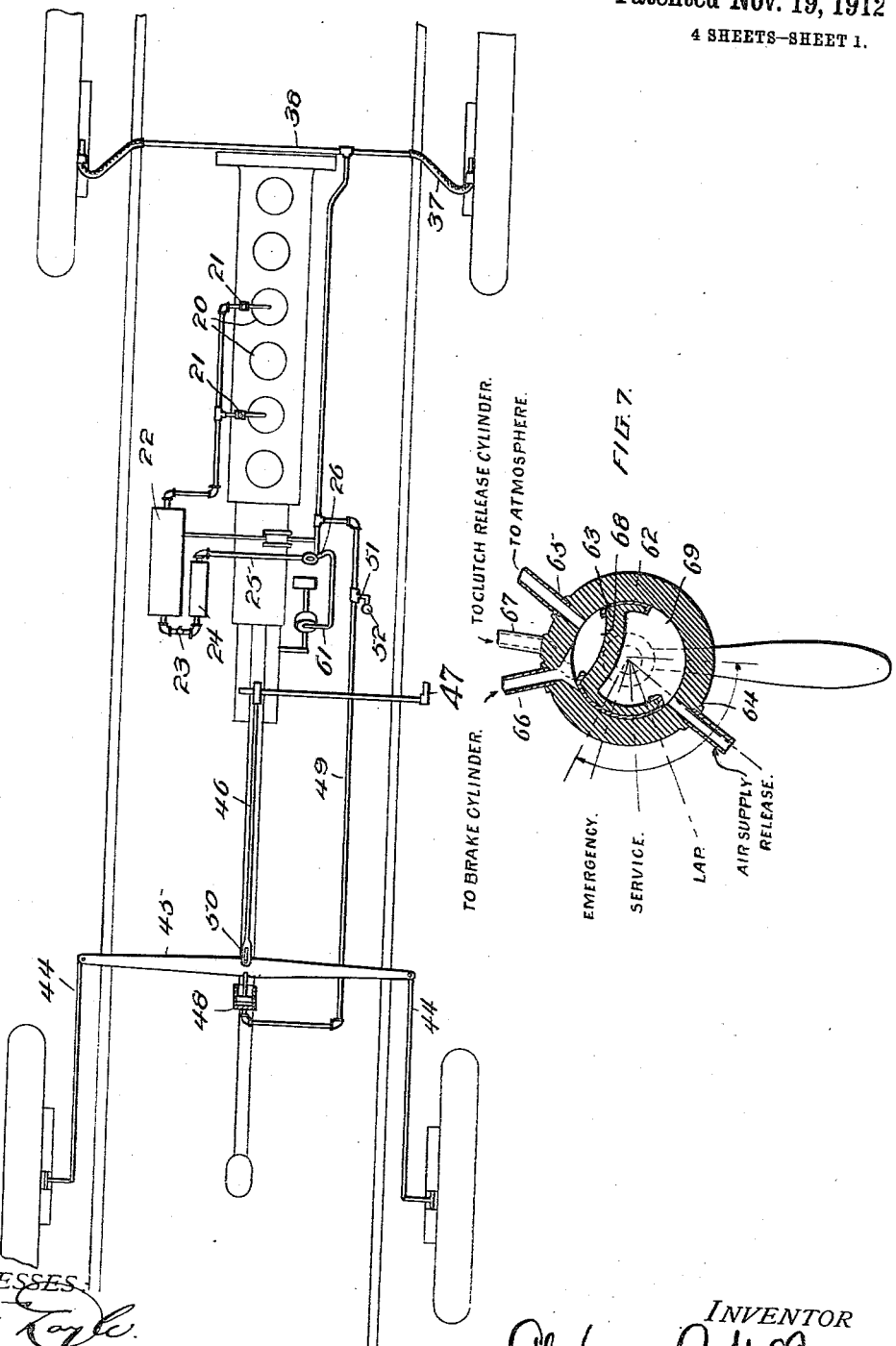

A. G. McGREGOR.
FLUID PRESSURE CONTROLLING SYSTEM FOR MOTOR VEHICLES.
APPLICATION FILED JUNE 14, 1910.
1,044,898.
Patented Nov. 19, 1912.
4 SHEETS—SHEET 2.
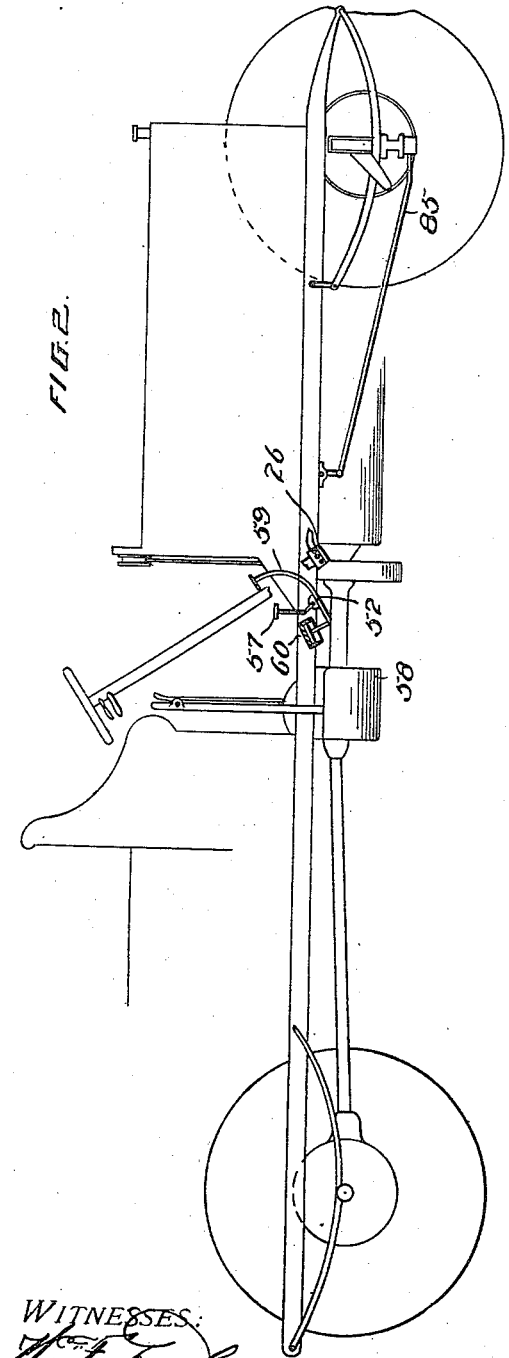
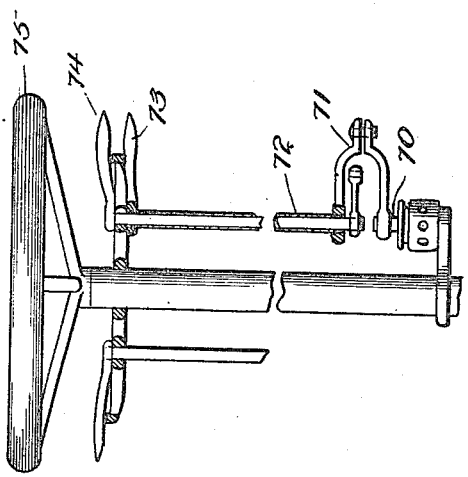
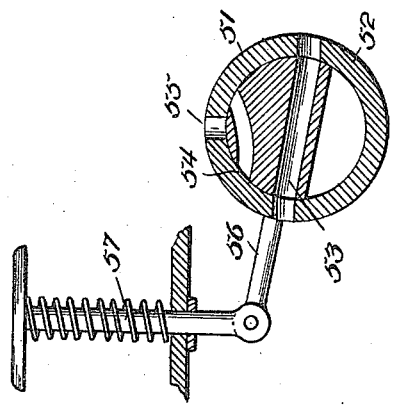
WITNESSES:
INVENTOR
BY
Attorneys A. G. McGREGOR.
FLUID PRESSURE CONTROLLING SYSTEM FOR MOTOR VEHICLES.
APPLICATION FILED JUNE 14, 1910.
1,044,898.
Patented Nov. 19, 1912.
4 SHEETS—SHEET 3.
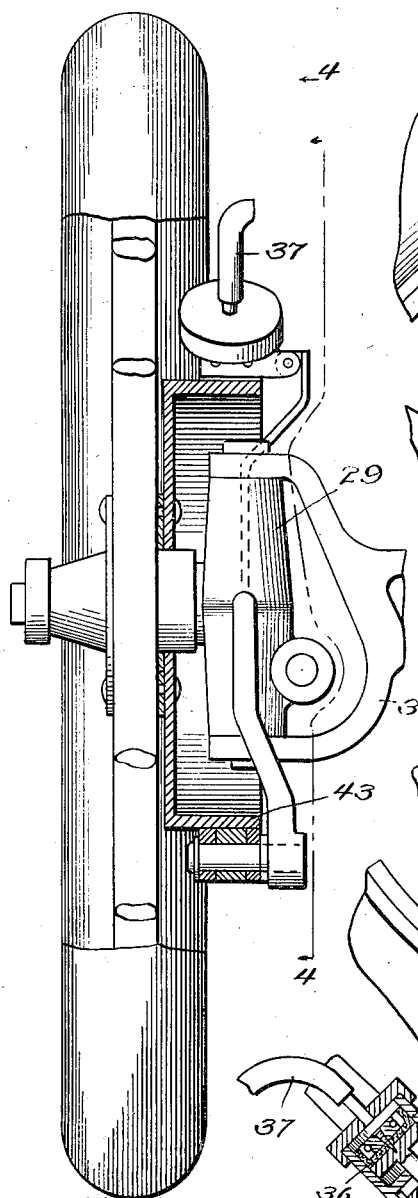
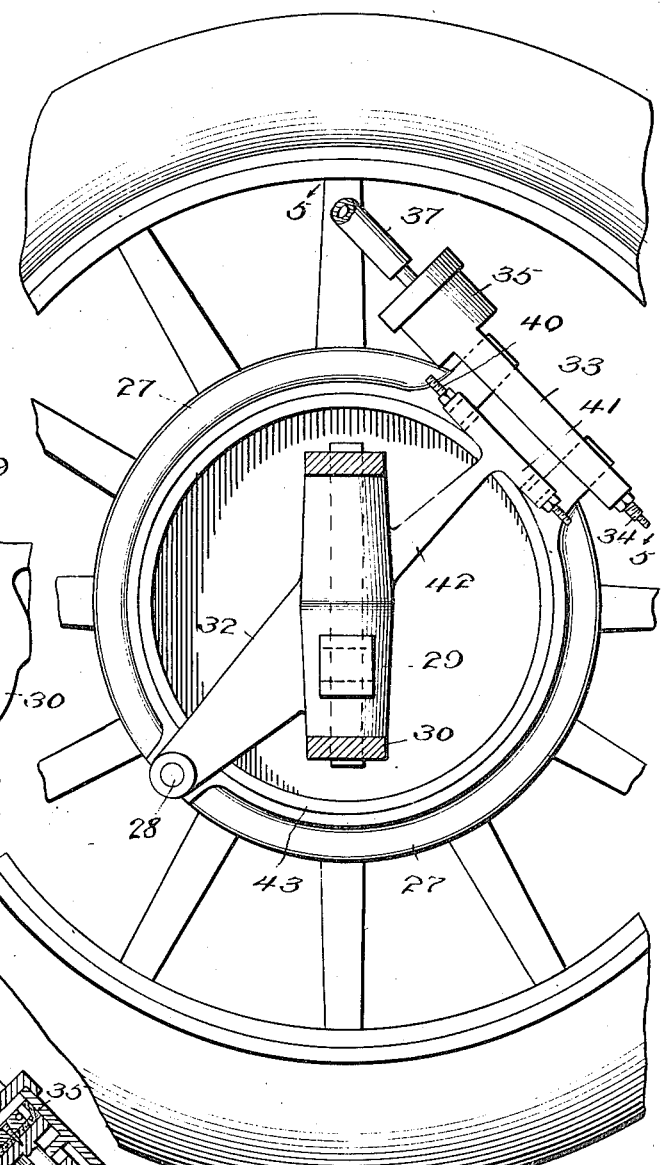
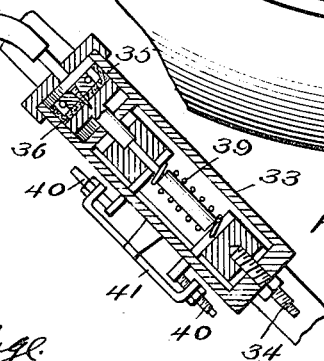
WITNESSES:
INVENTOR
Attorneys A. G. McGREGOR.
FLUID PRESSURE CONTROLLING SYSTEM FOR MOTOR VEHICLES.
APPLICATION FILED JUNE 14, 1910.

1,044,898.

Patented Nov. 19, 1912.

4 SHEETS—SHEET 4.

UNITED STATES PATENT OFFICE.

ALEXANDER GRANT McGREGOR, OF SALT LAKE CITY, UTAH.

FLUID-PRESSURE-CONTROLLING SYSTEM FOR MOTOR-VEHICLES.

1,044,898.  Specification of Letters Patent.  Patented Nov. 19, 1912.

Application filed June 14, 1910. Serial No. 566,893.

*To all whom it may concern:*

Be it known that I, ALEXANDER G. MC-GREGOR, a citizen of the United States, residing at Salt Lake City, in the county of Salt Lake and State of Utah, have invented or discovered certain new and useful Improvements in Fluid-Pressure-Controlling Systems for Motor-Vehicles, of which the following is a specification, reference being had therein to the accompanying drawings.

This invention relates to a system of brakes for motor vehicles, and to certain other parts associated therewith, whereby the control of the vehicle is facilitated.

It is one of the objects of the invention to provide improved means whereby brakes, preferably operated by fluid pressure, may be simultaneously applied to all four wheels of the vehicle.

I am aware that attempts have heretofore been made to produce apparatus of this character, but so far as I am aware none have resulted in the production of a system of simple and convenient construction whereby brakes may be applied to the front wheels of such a vehicle in an effective manner.

Another object of the invention is to provide a practical arrangement of parts which will permit of the application of the brakes of a motor vehicle either by the use of fluid pressure or by the manipulation of manually operated mechanical devices, as is often desirable, particularly in case of accident to the fluid pressure system.

Another object of the invention is to provide a braking system for all four wheels of the vehicle provided with means whereby the brakes for certain of the wheels may be controlled independently of the remaining brakes.

Still further objects of the invention are to provide an improved form of brake construction, and to provide an improved valve mechanism for controlling the various fluid pressure operated devices employed in the system.

These and other objects of the invention, together with means whereby the same may be carried into effect, will best be understood from the following description of certain forms or embodiments thereof illustrated in the accompanying drawings. It will be understood, however, that the constructions described and shown have been chosen for illustrative purposes merely, and that the invention may be embodied in other forms without departing from the spirit and scope thereof.

Figure 9:
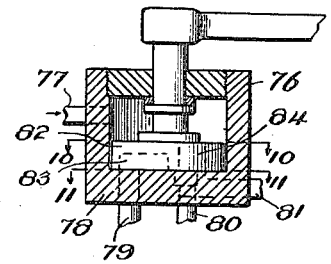
Figure 10:
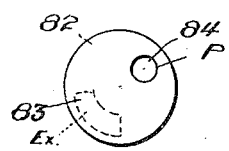
Figure 11:
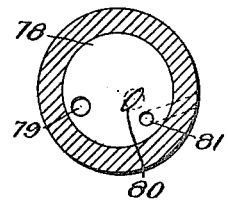

In said drawings: Figure 1 is a plan view of a motor vehicle having my invention applied thereto, only so much of the motor vehicle construction being shown as will make the application of the invention clear; Fig. 2 is a side elevation of the parts shown in Fig. 1; Fig. 3 is an elevation, partly in section, of one of the front wheels and the parts associated therewith; Fig. 4 is a section substantially on the line 4—4, Fig. 3; Fig. 5 is a section substantially on the line 5—5, Fig. 4, of one of the brake operating cylinders; Fig. 6 is a view similar to Fig. 4 showing a brake construction adapted to the rear wheels of the vehicle; Fig. 7 is a transverse section of one form of controlling valve; Fig. 8 is an elevation, partly in section, of the steering post and wheel, showing the preferred arrangement of the controlling valve operating means; Fig. 9 is a vertical section of a modified form of controlling valve; Figs. 10 and 11 are plan views respectively of the valve and valve seat shown in Fig. 9; and Fig. 12 is a detail sectional view of the valve for independently controlling the pressure to the rear brakes.

Fluid pressure for operating the mechanism hereinafter described is preferably derived from the compression or clearance space in the cylinder of the internal combustion engine driving the vehicle during the explosion and part of the compression and expansion strokes through pipes 20 provided with check valves 21 leading to a main pressure supply tank 22 from which the fluid under pressure is conveyed, through a reducing valve 23, to an auxiliary or distributing tank 24 connected by a pipe 25 with the controlling valve 26.

The fluid pressure operated brakes for the front wheels preferably comprise each a pair of brake members 27 pivoted at 28 to each other and to a non-rotating part of the vehicle upon which the respective wheel is rotatably mounted. In the case of the front wheels this non-rotating part may be the usual steering knuckle 29 pivotally carried by the front axle 30. A similar arrangement may, if desired, be employed for the rear wheels, in which said non-rotating part will preferably be the housing or bearing 31 for the rear axle as shown in Fig. 6. The pivot 28 for the brake members is preferably carried by an arm 32 formed upon or secured to said non-rotating part.

Secured to one of the brake members 27, as by a yoke 33, and adjusting screw 34, is an air or other fluid pressure cylinder 35 in which operates a piston 36 connected with the other brake member 27. Fluid pressure is supplied to the cylinder 35 by any suitable means, preferably a flexible conduit 37 connected with piping 38 leading to the controlling valve 26. The brake levers 27 are preferably normally separated by a spring 39 and their outward movement limited by suitable means such as adjusting screws 40 in threaded engagement with a yoke 41 at the extremity of an arm 42 carried by the steering knuckle or other non-rotating part above referred to. The brake members 27 coöperate with a suitable brake drum 43 carried by the wheel, said brake drum preferably substantially surrounding the steering knuckle 29, as shown in Fig. 3. This arrangement provides an extremely compact, effective and convenient construction, while the flexible conduits 37 permit turning of the front wheels for steering the vehicle in the usual manner.

The construction above described is particularly applicable to the front wheels of the vehicle, but may also be applied to the rear wheels, as above suggested. Preferably, however, the brakes for the rear wheels are of the usual form as shown in Fig. 1, said brakes being operated by rods 44 connecting said brakes with an evener 45, said evener being actuated to apply both rear brakes simultaneously by means of a rod 46 operatively connected with a hand lever 47. For operating the brakes for the rear wheels by means of fluid pressure there is preferably provided a fluid pressure device 48 comprising a coöperating piston and cylinder, one member of which is secured to the frame and the other to the evener 45, said device being supplied with fluid pressure through the piping 49 leading to the controlling valve 26. In order to permit the rear brakes to be operated by the device 48 independently of the lever 47, there is preferably provided a lost motion connection 50 between the evener 45 and rod 46.

In order to permit the rear brakes to be released independently of the front brakes, or to permit the front brakes to be set independently of the rear brakes, there is preferably provided in the piping 49 a valve 51 in a casing 52, said valve having a port 53, adapted in one position of the valve to connect the device 48 with the controlling valve 26, and with a port 54 adapted in another position of the valve to connect said device 48 with the atmosphere through a port 55 in the casing 52. The valve 51 may be operated by any suitable means, as by an arm 56 connected with a spring elevated foot member 57.

Motor vehicles as usually constructed comprise suitable transmission mechanism including a main clutch 58, which may be released by a suitable manually operated device, such as a foot lever 59, when it is desired to disconnect the engine or other prime mover and stop the vehicle.

As above stated the present invention contemplates the provision of means for controlling the clutch 58 by fluid pressure, such means comprising a fluid pressure operated device 60 comprising a coöperating cylinder and piston operatively connected with the foot lever 59 and supplied with pressure through piping 61 connected with the controlling valve 26.

The controlling valve 26 as shown in Fig. 7 comprises a valve casing 62 containing a valve proper 63. The valve casing 62 is provided with a port 64 communicating with the source of fluid pressure, as through the pipe 25, a second port 65 communicating with the atmosphere, and with two adjacent ports 66 and 67 communicating respectively with the air brake mechanisms and with the clutch controlling device 60. The port 66 is preferably of elongated form relatively to the port 67, so that said port may be uncovered either without uncovering the port 67 or simultaneously therewith. The valve 63 is provided with an exhaust cavity 68 and with a pressure cavity 69.

It will now be seen that in the position of the valve 63 shown in Fig. 7 the ports 66 and 67 will be in communication through the cavity 68 with the exhaust port 65, the brakes being at this time released and the clutch engaged. With the valve in "release" position, however, the port 67 will be covered, the port 66 will be in communication with the atmosphere, and the brakes released without affecting the clutch. With the valve in "lap" position, the ports 66 and 67 will both be covered. Turning of the valve to "service" position will place a portion of the elongated port 66 in communication with the pressure inlet port 64 through the cavity 69 without uncovering the port 67, thereby applying the brakes without releasing the clutch. A further turning of the valve to "emergency" position will cause the port 67 also to be placed in communication with the source of pressure thereby releasing the clutch.

The valve 63 is provided with a stem 70 connected by suitable means, as the levers 71 and sleeve 72, with a hand or operating lever 73 arranged adjacent to but movable independently of the usual throttle lever 74 associated with the steering wheel 75. By this arrangement it will be seen that the lever 73 for operating the controlling valve 26 may readily be operated simultaneously with the throttle lever 74 in starting and stopping the vehicle.

The modified controlling valve shown in Figs. 9 to 11 comprises a casing 76 having a fluid pressure inlet port 77 and a valve seat 78 provided with a port 79 leading to the atmosphere and with adjacent ports 80 and 81 leading respectively to the brake and clutch operating devices, the port 80 being elongated similar to the port 66 as above described in connection with the valve casing 62. Coöperating with the valve seat 78 is a rotary disk valve 82 having an exhaust cavity 83 and a pressure supply opening 84. The operation of the valve 82 is substantially similar to that of the valve 63 as will be apparent.

For assisting the vehicle springs in resisting any tendency of the front axle to turn when the brakes are applied to the front wheels, there is preferably provided a torsion rod 85 suitably secured to said axle and to the vehicle frame, as shown in Fig. 2.

Having thus described my invention I claim and desire to secure by Letters Patent:—

1. In a motor vehicle, in combination, an axle, a steering knuckle carried by said axle, a wheel rotatably mounted on said knuckle, a brake drum carried by said wheel, an arm projecting from said knuckle, a pair of brake members pivoted to said arm and coöperating with said brake drum, a fluid pressure cylinder and piston connecting said brake members, a second arm projecting from said knuckle, and means carried by said second arm for limiting the movement of said brake members.

2. In a motor vehicle, in combination, an axle, a steering knuckle carried by said axle, a wheel rotatably mounted on said knuckle, a brake drum carried by said wheel, an arm projecting from said knuckle and having its end adjacent said drum, a pair of brake members pivoted to the end of said arm and coöperating with said drum, and a fluid pressure cylinder and piston connecting the free ends of said brake members.

3. In a motor vehicle, in combination, an axle, a steering knuckle carried by said axle, a wheel rotatably mounted on said knuckle, a brake drum carried by said wheel, a pair of brake members supported by said knuckle and coöperating with said brake drum, and a fluid pressure cylinder and piston supported by said brake members for operating the same.

4. In a motor vehicle, in combination, a vehicle frame having a non-rotating part, a wheel rotatably carried by said part, a brake drum carried by said wheel, an arm projecting from said part and having its end adjacent said drum, a pair of brake members pivoted to the end of said arm and coöperating with said drum, a fluid pressure cylinder and piston connecting the free ends of said brake members, a second arm projecting from said non-rotating part, and means carried by said second arm for limiting the movement of said brake members.

In testimony whereof I affix my signature, in presence of two witnesses.

ALEXANDER GRANT McGREGOR.

Witnesses:
RALPH W. KERNS,
GEORGE O. TRUNKEY.